A. B. DENISON.
Bracket-Stand.
No. 8,669. Reissued April 15, 1879.
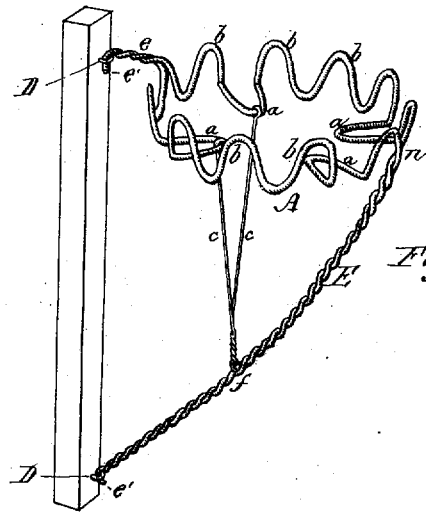
Fig. I
Witnesses.
W. B. Hall
Jas D. Brewer
Inventor
Amos B. Denison
By T. A. Curtis.
his Atty.
N. PETERS, PHOTO-LITHOGRAPHER, WASHINGTON, D. C.

UNITED STATES PATENT OFFICE.

AMOS B. DENISON, OF KEENE, NEW HAMPSHIRE.

IMPROVEMENT IN BRACKET-STANDS.

Specification forming part of Letters Patent No. 165,549, dated July 13, 1875; Reissue No. 8,669, dated April 15, 1879; application filed March 13, 1879.

*To all whom it may concern:*

Be it known that I, AMOS B. DENISON, of Keene, in the State of New Hampshire, have invented a new and useful Improved Bracket-Stand; and that the following is a full, clear, and exact description thereof, reference being had to the accompanying drawings, making a part of this specification, and to the letters of reference marked thereon.

The object of my invention is to provide a cheap bracket-stand which may be secured in place upon the wall or removed therefrom easily and quickly, and which, when in place, is suited to support flower-pots, statuettes, or other similar or ornamental articles; and to this end my invention consists of wire of suitable size, bent into the proper form at the upper part to receive the article to be placed thereon, and at the lower part into a suitable form to extend downward and in against the wall, and be secured to an eye or staple in the wall, the upper part being also formed to be secured to another eye or staple in the wall, the upper and lower parts being further strengthened and made firm by wire braces.

Figure I is a perspective view of my invention.

In the drawings, A represents the upper or platform portion of the bracket-stand, and E and *e* the two supports, whereby it is suspended or secured to the wall or side of a room, and these parts form the whole or main portion of the bracket, and may be made with two single pieces of wire, as follows: The wire is bent to form the upper hook, *e'*, and the two wires, united, are twisted or bent together to the desired point, forming an arm or support, *e*, and the wires then separate, each forming a half-circle in its general direction, but in its said circular course having at certain points, as at *b*, portions of the wire bent upward in a vertical direction, and at other certain points, as at *a*, portions bent inward in a horizontal direction, the said horizontal parts *a* serving to support whatever is placed thereon, and the said vertical parts *b* serving as a flange, to prevent whatever is placed on the stand from sliding off by the swinging motion of the stand, or from being knocked off from other causes. The two wires are again joined at *n*, and may be twisted or bent together from that point to the lower end, to form the support E, and a hook or catch, *e'*, is formed at the extreme lower end by bending the wire properly. The upper and lower parts of the device may be made more firm and rigid by any desirable number of braces, *c*, placed between the supports *e* and E, and which, when two are used, may be formed of a single piece of wire doubled, and, passing around one of the wires of the lower part at *f*, may be twisted for a short distance above, then separated, and be attached to the upper part or platform portion of the stand.

The wire may be of any desirable ornamental form, and may be bent into a great variety of ornamental shapes, and, with the hooks or catches *e'*, formed at the two points of support, above and below, may be readily and easily hooked into the eyes or staples D, which may be screwed or driven into the wall and there remain permanently. As the eyes are so small, they would scarcely be noticed in a wall or around the window-trimmings in a room. When secured in place on the wall, the stands are perfectly free to swing in either direction, and may be fastened in any desired position; or they may be placed in the corner of a room, and serve as a corner bracket-stand by securing the eyes or staples in the corner properly, and the stands may be finished by being tinned, or plated, or lacquered, or by any other desired means, and are very strong, extremely cheap, and ornamental.

Having thus described my invention, what I claim as new is—

An improved bracket-stand formed from bent wire, consisting of the platform portion A, the supports E and *e*, arranged with catches *e'*, for attachment to the wall, and the brace *c*, placed between the supports E and *e*, to make the whole more rigid and firm, substantially as described.

AMOS B. DENISON.

Witnesses:
T. A. CURTIS,
M. B. HALL.